(12) United States Patent
Oh

(10) Patent No.: US 9,033,755 B2
(45) Date of Patent: May 19, 2015

(54) LIFEJACKET PROVIDED WITH HEATING UNIT

(76) Inventor: Jong Hwan Oh, Gyeonggi-do (KR)

(*) Notice: Subject to any disclaimer, the term of this patent is extended or adjusted under 35 U.S.C. 154(b) by 303 days.

(21) Appl. No.: 13/703,699

(22) PCT Filed: May 7, 2010

(86) PCT No.: PCT/KR2010/002889
§ 371 (c)(1),
(2), (4) Date: Feb. 28, 2013

(87) PCT Pub. No.: WO2011/138986
PCT Pub. Date: Nov. 10, 2011

(65) Prior Publication Data
US 2013/0260623 A1   Oct. 3, 2013

(51) Int. Cl.
*B63C 9/11* (2006.01)
*B63C 11/28* (2006.01)
*B63C 9/08* (2006.01)
*B63C 9/087* (2006.01)
*C09K 5/18* (2006.01)

(52) U.S. Cl.
CPC . *B63C 9/11* (2013.01); *B63C 11/28* (2013.01); *B63C 9/08* (2013.01); *B63C 9/087* (2013.01); *C09K 5/18* (2013.01)

(58) Field of Classification Search
CPC ............ A41D 13/012; A41D 13/0125; A41D 13/0051; A41D 13/0058; B63C 11/28
USPC .................................................. 441/88–124
See application file for complete search history.

(56) References Cited

U.S. PATENT DOCUMENTS

| | | | | |
|---|---|---|---|---|
| 2,429,973 A | * | 11/1947 | Alexander | 126/204 |
| 3,367,319 A | * | 2/1968 | Carter, Jr. | 126/204 |
| 4,685,890 A | * | 8/1987 | Edwards | 441/94 |
| 5,755,110 A | * | 5/1998 | Silvas | 62/259.3 |

FOREIGN PATENT DOCUMENTS

| KR | 10-0691736 B1 | 3/2007 |
|---|---|---|
| KR | 10-0778141 B1 | 11/2007 |

OTHER PUBLICATIONS

International Search Report and Written Opinion for Application No. PCT/KR2010/002889 mailed Feb. 28, 2011.

* cited by examiner

*Primary Examiner* — S. Joseph Morano
*Assistant Examiner* — Andrew Polay
(74) *Attorney, Agent, or Firm* — RatnerPrestia

(57) ABSTRACT

A life jacket provided with a heating unit, capable of preventing a person wearing the life jacket from dying due to hypothermia after the person has fallen into water. The life jacket provided with a jacket main body in which a space is formed between an inner skin and an outer skin, and a floater and a heating unit which are inserted into the space of the jacket's main body includes: a heating portion for producing heat by contacting water; a water transferring member, one end of which arranged within the heating part and the other end of which exposed to a surface of the jacket's main body so that water infiltrates thereto from the other end by capillary action and permeated into the heating part; and a covering part attached on a surface of the main body of the jacket covering the other end of the water transferring member.

15 Claims, 5 Drawing Sheets

LIFEJACKET PROVIDED WITH HEATING UNIT

This application is the U.S. National Phase Application of PCT/KR2010/002889, filed May 7, 2010, the contents of this application are incorporated herein by reference.

TECHNICAL FIELD

The present invention relates to a life jacket provided with a heating unit, and more particularly, to a life jacket provided with a heating unit, capable of preventing a person wearing the life jacket from dying due to hypothermia after the person is fallen into water.

BACKGROUND ART

Generally, a life jacket is used for preventing a person wearing the life jacket from being drowned when the person is fallen into water, wherein a space part is provided between an inner skin and an outer skin, into which air or floater is embedded to help the person who is fallen into water to be floated. The life jacket is worn essentially for preventing a drowning accident during leisure time being spent at a water side of a river, a lake or sea.

However, the life jacket is not sufficient for safeguarding a person's life with only floating function in the case where a survivor in a marine accident is unconscious or several hours to several days have been already lapsed for rescuing a survivor. That is, the main cause of death of a person who has been fallen into water for a long period of time is mostly due to hypothermia, i.e., a decline of his/her body temperature.

Accordingly, recently a technology for providing a more excellent life jacket in consideration of the above described-drawbacks has been disclosed in Korean Utility Model Registration No. 0432410 (hereinafter, referred to as "prior art"). A life jacket according to the prior art is configured such that a heating unit for generating heat through a chemical reaction is included on a space part at an inside of an outer skin thereof together with a floater. Accordingly, a rapid decline of a body temperature can be prevented by operating the heating unit by a survivor who is fallen into water.

However, in a case of the heating unit to be applied to the life jacket according to the prior art, it is configured in such a manner that an metal plate to be impacted is embedded to an inside of a vinyl pack and at the same time the vinyl pack is filled with acetic acid sodium in a liquid state and sealed to produce an exothermic reaction with impact from the metal plate. However, in the life jacket according to the prior art, there arises a problem that an unexpected external impact is transmitted to the life jacket to cause an unexpected exothermic reaction by the heating unit arranged therein while a person does activities while wearing the life jacket in advance before he/she is fallen into water. Further, in the case of the heating unit using the metal plate and acetic acid sodium, there arises a problem that the heating temperature cannot be kept for a long period of time since the exothermic reaction proceeds rapidly.

DISCLOSURE

Technical Problem

An embodiment of the present invention is relates to provide a life jacket provided with a heating unit, capable of preventing a person wearing the life jacket from dying due to hypothermia even in case where the person is exposed to water for a long time period by lasting the exothermic operation for a long period of time.

The technical problems to be achieved by the present invention are not limited to as described-above, and other technical solutions which are not described will be understood obviously by a person who has ordinary knowledge in a technical field to which the invention pertains from the following description.

Technical Solution

One aspect of the present invention relates to a life jacket provided with a main body of the jacket in which a space part is formed between an inner skin and an outer skin, and a floater and a heating unit which are inserted into the space part of the main body of the jacket, including: a heating portion for producing heat by contacting water; a water transferring member one end of which is arranged within the heating part and the other end of which is exposed to a surface of the main body of the jacket so that water infiltrates thereto from the other end by capillary action to be permeated into the heating part; and a covering part that is attached on a surface of the main body of the jacket while covering the other end of the water transferring member.

Here, one end of the water transferring member is fixed to the inner skin of the main body of the jacket.

Further, the covering part is connected to or separated from the water transferring member.

Furthermore, the heating unit is provided with respect to a front part of the main body of the jacket as a plural.

Meanwhile, the one end of the water transferring member is connected while passing through in sequence the inner parts of a plurality of the heating parts from the upper part to the lower part of an arrangement thereof.

Further, the one end of the water transferring member is connected while passing through in sequence the inner parts of a plurality of the heating parts which are arranged longitudinally from one side to the other side of an arrangement thereof.

Further, the water transferring member is fabricated with a thin fibrous wire.

The covering part is attached on the main body of the jacket by means of an adhering agent, Velcro or backstitch.

Specially, the covering part is provided with a handle.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

According to the life jacket provided with a heating unit of the present invention, the water transferring member of the heating unit allows exothermic operation of the heating part to be lasted for a long period of time to keep body temperature of a person who is fallen into water for a long period of time thereby increasing greatly a survival probability of the person.

MODE FOR CARRYING OUT THE INVENTION

Figure 1:
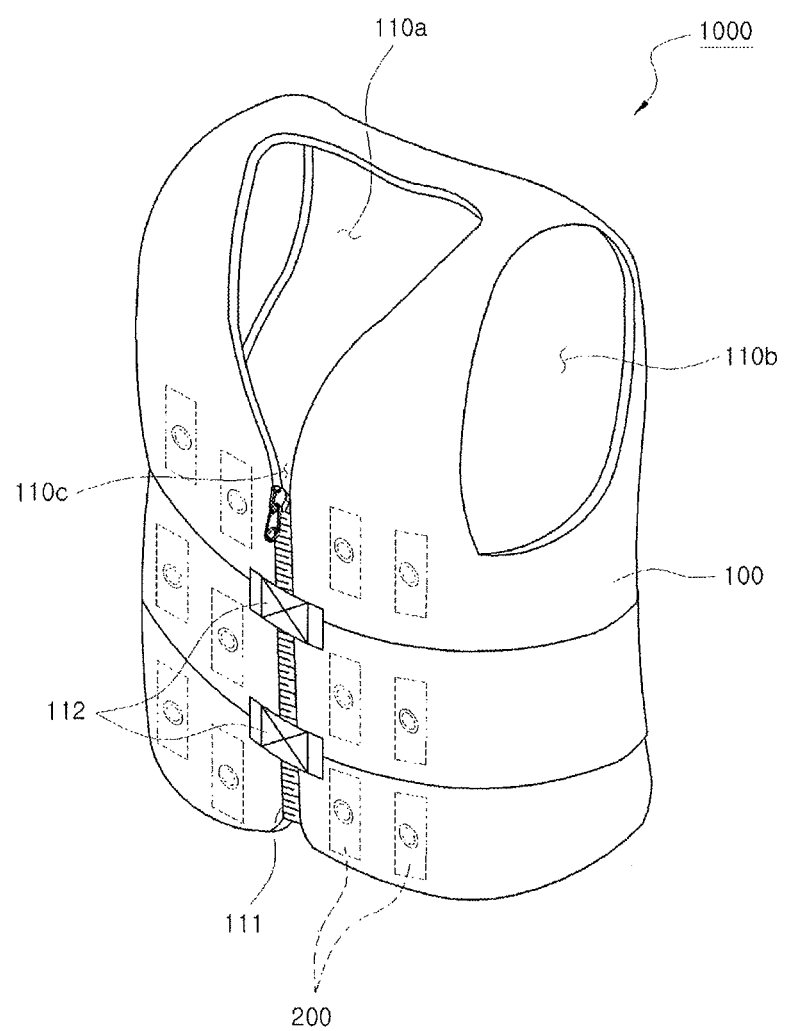
FIG. 1 is a perspective view illustrating schematically a life jacket provided with a heating unit according to an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
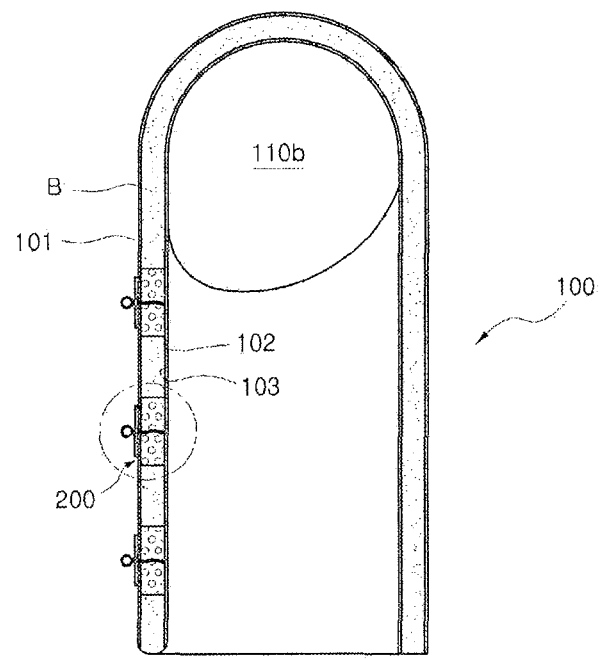
FIG. 2 is a side-sectional view illustrating schematically a life jacket provided with a heating unit as shown in FIG. 1.
Figure 3:
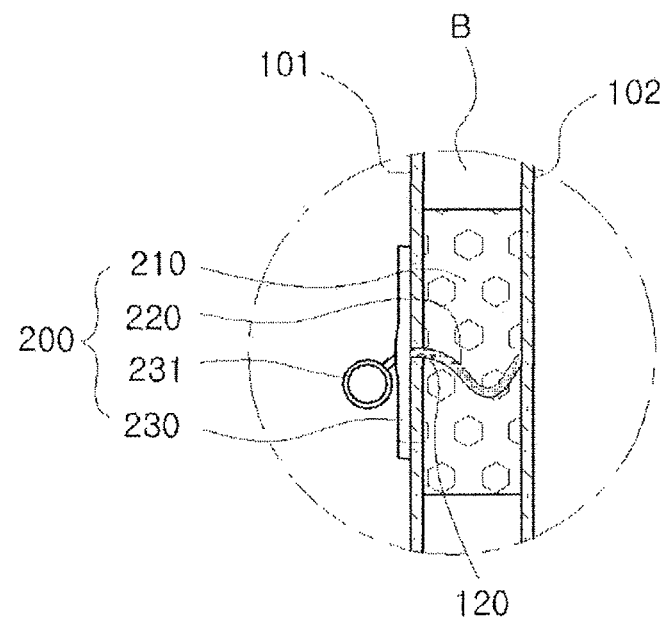
FIGS. 3 and 4 are enlarged sectional views illustrating schematically operational states of the heating unit provided in the life jacket as shown in FIG. 2, respectively, according to an exemplary embodiment of the present invention.
Figure 4:
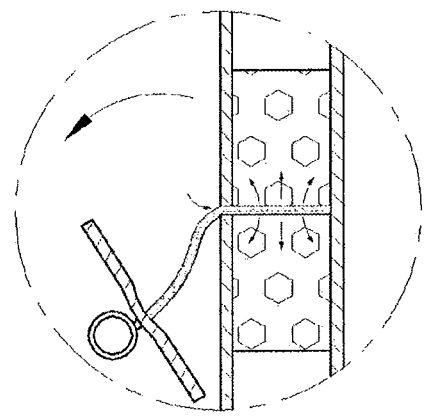
Figure 5:
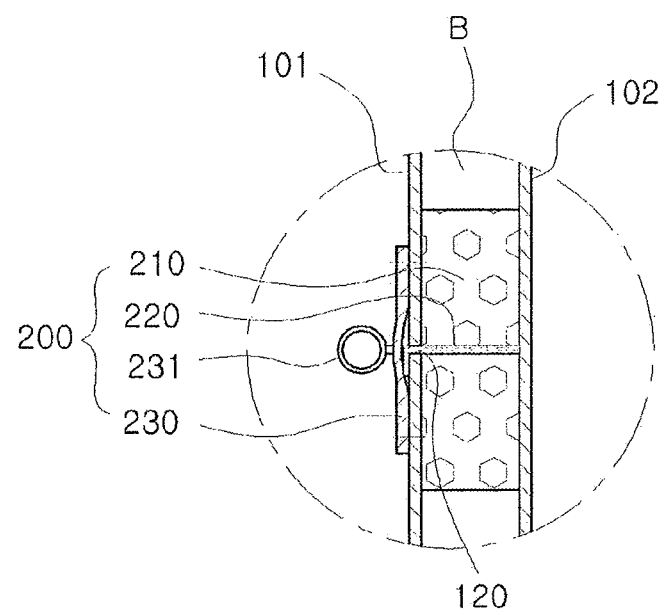
FIGS. 5 and 6 are enlarged sectional views illustrating schematically operational states of the heating unit provided in the life jacket as shown in FIG. 2, respectively, according to another exemplary embodiment of the present invention.
Figure 6:
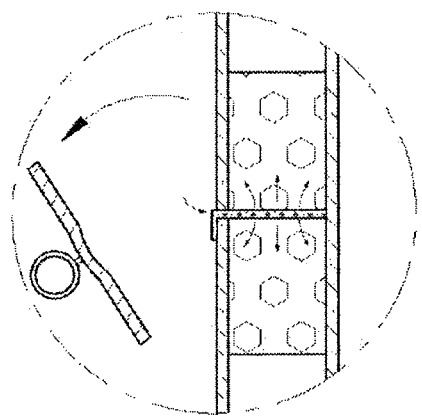
Figure 7:
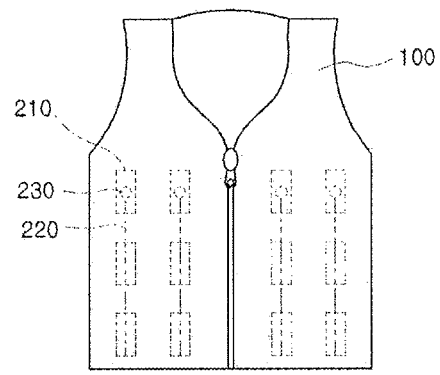
FIGS. 7 to 9 are front views illustrating schematically arrangements of the heating unit according to another embodiment of the present invention, respectively.
Figure 8:
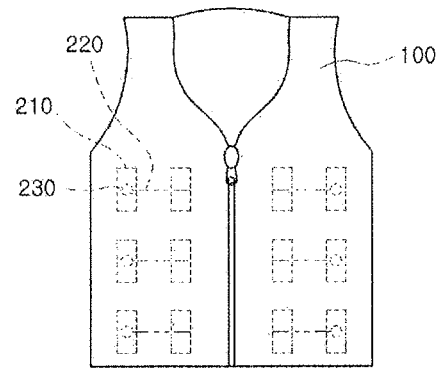
Figure 9:
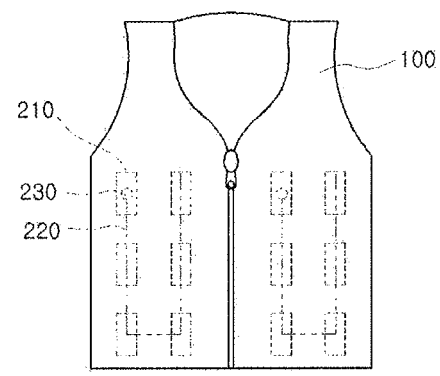

FIG. 1 is a perspective view illustrating schematically a life jacket provided with a heating unit according to an exemplary embodiment of the present invention. FIG. 2 is a side-sectional view illustrating schematically a life jacket provided with a heating unit as shown in FIG. 1. FIGS. 3 and 4 are enlarged sectional views illustrating schematically operational states of the heating unit provided in the life jacket as shown in FIG. 2, respectively, according to an exemplary embodiment of the present invention. FIGS. 5 and 6 are enlarged sectional views illustrating schematically operational states of the heating unit provided in the life jacket as shown in FIG. 2, respectively, according to another exemplary embodiment of the present invention. FIGS. 7 to 9 are front views illustrating schematically arrangements of the heating unit according to another embodiment of the present invention, respectively.

As shown in FIGS. 2 to 4, a life jacket 1000 provided with a heating unit according to an exemplary embodiment of the present invention includes a main body of the jacket 100 in which a space part 103 is formed between an outer skin 101 and an inner skin 102, a floater B and the heating unit 200 which are inserted into the space part 103 of the main body of the jacket 100.

As shown in FIG. 1, the main body of the jacket 100 to be worn on upper half of a body of a person who does activities on water side of river, lake or sea includes a neck insertion part 110a, an arm insertion part 110b and an opening part 110c for opening and closing a front of the life jacket.

Of course, the floater B and the heating unit 200 are inserted into the space part 103 formed between the outer skin 101 and the inner skin 102 of the main body of the jacket 100.

Further, the outer skin 101 and the inner skin 102 are waterproofed for preventing water from permeating into the space part 103.

Further, the opening part 110c may be provided with a zipper part 111 and a buckle part 112 to rapidly open and close the front and further stably keep a closed state.

Meanwhile, as not shown in drawings, a pocket (not shown) for storing props of a wearer may be formed or an identification bend (not shown) for surely indentifying the wear at nighttime may be additionally provided on the main body of the jacket.

Furthermore, an exposure hole 120 is formed on the main body of the jacket 100 for the other end of a water transferring member 220 of the heating unit 200, which will be described later, to be exposed therethrough.

Specially, the heating unit 200 for exothermic reaction is inserted into the space part 103 of the main body of the jacket 100 for preventing the body temperature from being declined in a situation where the wearer cannot be rescued promptly after he/she is fallen into water.

In more detailed description, as shown in FIGS. 3 and 4, the heating unit 200 includes a heating part 210 to be exothermic-reacted by contacting water, a water transferring member 220 one end of which is arranged within the heating part 210 and the other end of which is exposed to a surface of the main body of the jacket 100, and a covering part 230 for interrupting randomly the other end of the water transferring member 220 from contacting water.

Here, the heating part 210 is to chemically react with water to emit heat wherein it may contain a compound of Na, Ca, Mg, etc., belong to I group and II group element, and may contain representatively lime, sodium hydroxide and sodium-acetate, etc. Among them, the lime mixed with iron is reacted with water to emit heat of 60-90° C.

Further, the water transferring member 220 serves as medium to transfer water for the exothermic reaction of the heating part 210 and a thin fibrous wire through which water infiltrates with capillary phenomenon is used therein.

That is, the water transferring member 220 allows water to infiltrate through the capillary phenomenon to the other end thereof and the heating part 210 to produce heat.

Here, the exothermic operation of the heating part 210 may be preferably kept for a long period of time by significantly reducing the amount of water to be permeated into the heating part 210 by the water transferring member 220.

The water transferring member 220 is longer than a sectional thickness of the main body of the jacket 100, one end of which is fixed to the inner skin and the other end of which is exposed with a predetermined length.

Meanwhile, the covering part 230 serves as shutoff in a closed state at normal time whereas the covering part 230 allows the other end of the water transferring member 200 to be exposed only when a person wearing the life jacket needs to.

Here, the covering part 230 may be attached on a surface of the outer skin 101 of the main body of the jacket 100 by means of an adhering agent, Velcro or backstitch.

As shown in FIGS. 3 and 4, the covering part 230 may be separated while it is connected to the other end of the water transferring member 220 and further, as shown in FIGS. 5 and 6, is may be fully separated from the water transferring member 220.

Further, the covering part 230 is provided with a very small gripping part through which a person wearing the life jacket can easily tear the covering part 230 from the main body of the jacket 100 by using his/her hands while the covering part is attached on the main body of the jacket.

Furthermore, the covering part 230 is further provided with a handle 231 fabricated with a separate ring so that the covering part 230 can be more easily torn by using the handle.

The heating unit 200 as described-above is arranged transversely and longitudinally with respect to a front part of the main body of the jacket 100 as a plural so that one of a plurality of heating units is used whenever a wearer who is fallen into water is necessary and the water transferring member 220 allows the exothermic operation of the heating part 210 to be kept for a long period of time thereby greatly increasing survival probability of the wearer.

Meanwhile, FIGS. 7 to 9 are views schematically the heating unit 200 according to another embodiments of the present invention, respectively. According to the embodiment, with respect to a plurality of the heating parts 210 which are arranged transversely and longitudinally the other end of the water transferring member 220 is exposed from a surface of the main body of the jacket 100 and one end thereof is connected while passing through the inner parts of the main body of the jacket from an upper heating part 210 and a lower heating part 210 which are arranged longitudinally (see FIG. 7), or the one end of the water transferring member 220 is connected while passing through the inner parts of the main body of the jacket from one side of the heating part 210 to the other side of the heating part 210 which are arranged transversely (see FIG. 8 Further, the one end of the water transferring member 220 is extended to passing through from a longitudinal direction to a transverse direction in sequence the inner parts of a plurality of heating parts 210 (see FIG. 9).

In case the heating unit arranged as described-above, the wearer removes the covering part 230 once, and then the water input through the water transferring member 220 passes through in sequence the inner part of the heating part 210, and thus the wearer is not necessary to remove repeatedly the covering portion 230.

In this case, the covering part 230 may be formed on a chest part of the life jacket on which hearts are located when the life jacket is worn by a person to firstly heating the chest part thereby increasing survival probability.

While the present invention has been described with respect to the specific embodiments, it will be apparent to those skilled in the art that various changes and modifications may be made without departing from the spirit and scope of the invention as defined in the following claims.

The invention claimed is:

1. A life jacket provided with a main body of the jacket in which a space part is formed between an inner skin and an outer skin, and a floater and a heating unit which are inserted into the space part of the main body of the jacket, comprising:
   a heating part for producing heat by contacting water;
   a water transferring member one end of which is arranged within the heating part and the other end of which is exposed to a surface of the main body of the jacket so that water infiltrates the water transferring member from the other end by capillary action to be permeated into the heating part; and
   a covering part that is attached on a surface of the main body of the jacket while covering the other end of the water transferring member,
   wherein the water transferring member is fabricated with a fibrous wire.

2. The life jacket of claim 1, wherein one end of the water transferring member is fixed to the inner skin of the main body of the jacket.

3. The life jacket of claim 1, wherein the covering part is connected to or separated from the water transferring member.

4. The life jacket of claim 1, wherein the heating unit is provided with respect to a front part of the main body of the jacket as a plurality of heating parts.

5. A life jacket provided with a main body of the jacket in which a space part is formed between an inner skin and an outer skin, and a floater and a heating unit which are inserted into the space part of the main body of the jacket, comprising:
   a heating part for producing heat by contacting water;
   a water transferring member one end of which is arranged within the heating part and the other end of which is exposed to a surface of the main body of the jacket so that water infiltrates the water transferring member from the other end by capillary action to be permeated into the heating part; and
   a covering part that is attached on a surface of the main body of the jacket while covering the other end of the water transferring member,
   wherein one end of the water transferring member is connected while passing through in sequence inner parts of a plurality of the heating parts from an upper heating part to a lower heating part of an arrangement of the plural heating parts.

6. A life jacket provided with a main body of the jacket in which a space part is formed between an inner skin and an outer skin, and a floater and a heating unit which are inserted into the space part of the main body of the jacket, comprising:
   a heating part for producing heat by contacting water;
   a water transferring member one end of which is arranged within the heating part and the other end of which is exposed to a surface of the main body of the jacket so that water infiltrates the water transferring member from the other end by capillary action to be permeated into the heating part; and
   a covering part that is attached on a surface of the main body of the jacket while covering the other end of the water transferring member,
   wherein the one end of the water transferring member is connected while passing though in sequence inner parts of a plurality of the heating parts which are arranged transversely from one side to the other side of an arrangement thereof.

7. The life jacket of claim 1, wherein the covering part is attached on the main body of the jacket by means of an adhering agent, a hook and loop fastener, or backstitch.

8. The life jacket of claim 7, wherein the covering part is provided with a handle.

9. The life jacket of claim 5, wherein the water transferring member is fabricated with a fibrous wire.

10. The life jacket of claim 6, wherein the water transferring member is fabricated with a fibrous wire.

11. The life jacket of claim 2, wherein the covering part is attached on the main body of the jacket by means of an adhering agent, a hook and loop fastener, or backstitch.

12. The life jacket of claim 3, wherein the covering part is attached on the main body of the jacket by means of an adhering agent, a hook and loop fastener, or backstitch.

13. The life jacket of claim 4, wherein the covering part is attached on the main body of the jacket by means of an adhering agent, a hook and loop fastener, or backstitch.

14. The life jacket of claim 5, wherein the covering part is attached on the main body of the jacket by means of an adhering agent, a hook and loop fastener, or backstitch.

15. The life jacket of claim 6, wherein the covering part is attached on the main body of the jacket by means of an adhering agent, a hook and loop fastener, or backstitch.

* * * * *